United States Patent
Favero

(10) Patent No.: US 11,641,975 B2
(45) Date of Patent: May 9, 2023

(54) FLOW SYSTEM DELIVERY SYSTEM AND BEVERAGE MACHINE USING SAME

(71) Applicant: KONINKLIJKE PHILIPS N.V., Eindhoven (NL)

(72) Inventor: Andrea Favero, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/787,929

(22) PCT Filed: Dec. 16, 2020

(86) PCT No.: PCT/EP2020/086473
§ 371 (c)(1),
(2) Date: Jun. 21, 2022

(87) PCT Pub. No.: WO2021/122782
PCT Pub. Date: Jun. 24, 2021

(65) Prior Publication Data
US 2023/0012837 A1    Jan. 19, 2023

(30) Foreign Application Priority Data
Dec. 19, 2019  (EP) ..................... 19217784

(51) Int. Cl.
*A47J 31/52*   (2006.01)
*A47J 31/46*   (2006.01)
*F04D 15/02*   (2006.01)

(52) U.S. Cl.
CPC ........... *A47J 31/525* (2018.08); *A47J 31/468* (2018.08); *F04D 15/0218* (2013.01)

(58) Field of Classification Search
CPC ... A47J 31/468; A47J 31/525; F04D 15/0218; F04D 15/0236
See application file for complete search history.

(56) References Cited

U.S. PATENT DOCUMENTS

2021/0289982 A1*  9/2021  Smith ................. A47J 31/3695

FOREIGN PATENT DOCUMENTS

| CN | 108709589 | * | 10/2018 |
| EP | 2439413 A2 | | 4/2012 |
| EP | 2926699 | * | 10/2015 |
| EP | 3067564 A1 | | 9/2016 |
| EP | 3569865 A1 | | 11/2019 |
| GB | 2471908 | * | 1/2011 |
| SE | 0802287 | * | 4/2010 |
| WO | 2009006927 A1 | | 1/2009 |
| WO | WO2019008758 | * | 1/2019 |

OTHER PUBLICATIONS

Extended European Search Report issued in connection with corresponding EP Application No. 19217784.8 dated Jun. 8, 2020.

\* cited by examiner

*Primary Examiner* — Anthony J Weier
(74) *Attorney, Agent, or Firm* — Maschoff Brennan

(57) ABSTRACT

A flow delivery system to deliver and monitor a liquid flow, using a pump, and a monitoring device (e.g. a flow meter) are described. A controller determines if the flow is a liquid flow or a gas flow by reducing a drive signal for the pump from a first drive signal to a second drive signal. This changes the characteristics of both the pump drive signal and the characteristics of the resulting flow. Based on the change in the characteristics, the flow is determined to be a liquid flow or a gas flow.

15 Claims, 3 Drawing Sheets

FLOW SYSTEM DELIVERY SYSTEM AND BEVERAGE MACHINE USING SAME

CROSS-REFERENCE TO RELATED APPLICATIONS

The present application is a U.S. National Phase application under 35 U.S.C. § 371 of International Application No. PCT/EP2020/086473 filed Dec. 16, 2020, which claims the benefit of European Patent Application No. 19217784.8, filed on Dec. 19, 2019. These applications are hereby incorporated by reference herein.

FIELD OF THE INVENTION

The invention relates to flow delivery systems, for example for delivering hot water as part of a beverage making machine.

BACKGROUND OF THE INVENTION

There are many types of beverage making machine, in which a certain beverage type (coffee, tea, milk, chocolate, etc.) is processed by adding water, in many cases hot water.

These machines are normally equipped with a water supply system, which typically includes a water container, a flow meter, a water pump, a water heater and a brewing unit, all connected by a hydraulic circuit.

The flow meter is normally used to measure the water volume to be delivered to the brewing unit, according to the selected beverage or recipe. It is also used to measure the water flow rate, and this can be used to adjust the water pump to a predetermined water flow rate level according to the selected beverage or recipe.

The most cost effective water supply systems avoid the need for a water level sensor in the water container by using the water flow meter to detect when the water has run out, once air is flowing through the flow meter.

Flow meters used in the above types of appliance normally make use of the moving fluid stream to turn an impeller. A magnetic sensor arrangement is for example provided, comprising a magnet or set of magnets on the impeller and a magnetic sensor. This sensor arrangement is used to detect the impeller's revolutions. Impeller revolutions are proportional to the fluid volume flowing through the flow meter, therefore the water volume can be measured and this information can easily be transformed to flow rate by making use of the time domain.

Water pumps used in the above appliances normally are reciprocating pumps. Water pump technology has improved over time, and self-priming versions allow more cost effective water supply systems.

When a beverage appliance does not have a water level sensor it is expected that air will enter the water supply system each time the amount of water amount left in the water container is smaller than the selected beverage. After the water container has been refilled, the pump has to self-prime, during which an air flow is generated until water is sucked into the pump.

The impeller of the flow meter does not easily rotate when air is flowing through, at the end of a water flow, for example because a certain amount of water remains in the flow meter. This prevents rotating of the impeller by the air flow generated by the water pump. It is known to use this condition to detect when the water supply reaches an end during a beverage preparation.

A problem can arise when the flow meter is fully dry. In such case, the impeller friction may be very low due to the absence of the water adhesion and the effect of the water viscosity on the impeller. When the flow meter is fully dry, the air flow generated by the water pump can easily cause the impeller to rotate, resulting in a flow signal.

As a consequence, the appliance control interprets the air flow as a water flow, preventing it from stopping the pump promptly.

This may result in pump deterioration, by working too long in a dry condition, because of the lack of lubrication and cooling effect normally provided by the water. There may also be user dissatisfaction because the beverage is not delivered while the appliance does not provide any alert feedback to indicate the reason for the problem.

There is therefore a need for an improved flow delivery system which can reliably determine when air is flowing instead of water, for example for deactivating a pump and consequently provide a useful feedback to the user.

SUMMARY OF THE INVENTION

The invention is defined by the claims.

According to examples in accordance with an aspect of the invention, there is provided a flow delivery system for delivering and monitoring a liquid flow, the system comprising:

a pump;

a monitoring device for monitoring a flow generated by the pump;

a sensing arrangement for detecting the presence of a flow monitored by the monitoring device; and a controller for determining if the detected flow is a liquid flow or a gas flow, wherein the controller is adapted to:
control the pump with a first drive signal;
in response to a detected flow which may be a gas flow, to reduce the drive signal for the pump from a first drive signal to a second drive signal, thereby to change the characteristics of the pump drive signal and the characteristics of the resulting flow; and
based on the change in said characteristics, determine if the flow is a liquid flow or a gas flow.

This flow delivery system provides a change in the pump drive signal as part of a test for determining if gas or liquid is flowing. The effect of this change on the flow and/or the pump drive signal itself, is used to enable discrimination between a gas flow (e.g. air) and a liquid flow (e.g. water). This provides a reliable determination which may for example be used to turn off the pump to avoid long periods of gas (and hence dry) flow.

The first drive signal may be a pump drive signal intended for delivering a liquid flow at a predetermined rate, for example the first drive signal may be a maximum pump drive signal. Thus, a signal is provided for delivering a liquid flow, and then a reduced drive signal is provided as a test for whether a detected flow was gas or liquid. If there is no detected flow at all, then the test may not be needed.

The controller may be adapted to determine if a detected flow "may be a gas flow" (as recited in claim 1) by detecting any flow. Thus, any flow may potentially be a gas flow, and when any flow is detected, a reduced drive signal may be used to test if the flow is liquid or gas.

Alternatively, the controller may be adapted to determine if a detected flow "may be a gas flow" by determining if a flow parameter for the detected flow is below a first threshold. Thus, if a flow parameter is above a threshold it may be assumed that there is a liquid flow, because a gas flow generated by the pump based on the pump first drive signal would always be insufficient to result in that particular flow parameter value. This avoids the need to perform the step of applying a reduced drive signal in many cases, in that it can be determined already that there is definitely a liquid flow.

In a first set of examples, the controller is adapted to:

in response to the detected flow which may be a gas flow, reduce the drive signal for the pump from a first drive signal to a predetermined second drive signal; and based on a measured flow parameter when the pump is driven with the second drive signal, determine if the flow is a liquid flow or a gas flow.

In this set of examples, a lower pump drive signal is used for testing. The flow levels expected for gas flow and for liquid flow are for example better resolved at that lower pump drive signal than at the first (e.g. maximum flow) pump drive signal.

In a second set of examples, the controller is adapted to:

in response to the detected flow which may be a gas flow, reduce the drive signal for the pump in a controlled manner from the first drive signal;

monitor a flow parameter during the reducing drive signal;

determine the second drive signal as that at which the flow parameter drops to a predetermined level; and based on the second drive signal, determine if the flow is a liquid flow or a gas flow.

In this approach, the pump drive signal is reduced until a predetermined lower flow parameter (e.g. flow rate) is reached. The pump drive signal needed for this lower flow rate is then indicative of whether the flow is a gas flow or a liquid flow. The progressively decreasing signal may be a ramp signal.

In a third set of examples, the controller is adapted to:

in response to the detected flow which may be a gas flow, reduce the drive signal for the pump from a first drive signal to a zero drive signal; and based on the temporal response of a measured flow parameter, determine if the flow is a liquid flow or a gas flow.

This temporal response may for instance relate to the way a rotary member of the monitoring device slows when a flow has been interrupted. Gas and liquid provide different resistance to the slowing of the rotary member.

In all examples, the flow parameter may comprise an indication of the rotation speed of the rotary member. Thus, it does not need to be a direct measure of flow rate or even converted into a flow rate.

The monitoring device for example comprises a rotary member which is rotated by a flow through the monitoring device generated by the pump, and the sensing arrangement is for sensing rotation of the rotary member, thereby to detect the flow.

The flow parameter may then for instance comprises a characteristic of a pulse train signal generated by the monitoring device. The characteristic may be a frequency, a period between pulses, or a period between sequential level changes.

The invention also provides a beverage machine comprising:

a water container;
a beverage making section; and
a flow delivery system as defined above for delivering water from the water container to the beverage making section and for monitoring the water flow to the beverage making section, wherein the controller is also for determining when the water container is empty and for stopping the pump when the water container is empty.

The flow delivery system may thus be used to stop the pump from running dry and avoids the need for a water sensor in the water container for determining when the water has run out. Since the components of the flow delivery system are already all required as part of the beverage creation process, there is no overhead in implementing the liquid and gas detection of the flow delivery system.

The beverage machine for example comprises a coffee machine.

The invention also provides a method for delivering a liquid flow using a pump and monitoring the liquid flow, comprising:

sensing using a monitoring device thereby to detect a flow; and determining if the flow is a liquid flow or a gas flow by:
controlling the pump with a first drive signal;
detecting a flow which may be a gas flow, and in response:
reducing the drive signal for the pump from a first drive signal to a second drive signal, thereby to change the characteristics of the pump drive signal and the characteristics of the resulting flow; and
determining if the flow is a liquid flow or a gas flow based on the change in said characteristics.

This is the method implemented by the flow delivery system defined above.

In the first set of examples, in response to detecting a flow which may be a gas flow, the method may comprise:

reducing the drive signal for the pump from a first drive signal to a predetermined second drive signal; and determining if the flow is a liquid flow or a gas flow based on a measured flow parameter when the pump is driven with the second drive signal.

In the second set of examples, in response to detecting a flow which may be a gas flow, the method may comprise:

reducing the drive signal for the pump in a controlled manner from the first drive signal;

monitoring a flow parameter during the reducing drive signal;

determining the second drive signal as that at which the flow drops to a predetermined level; and based on the second drive signal, determining if the flow is a liquid flow or a gas flow.

In the third set of examples, in response to detecting a flow which may be a gas flow, the method may comprise:

reducing the drive signal for the pump from the first drive signal to a zero drive signal; and determining if the flow is a liquid flow or a gas flow based on the temporal response of a measured flow parameter.

These methods may be implemented in software.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
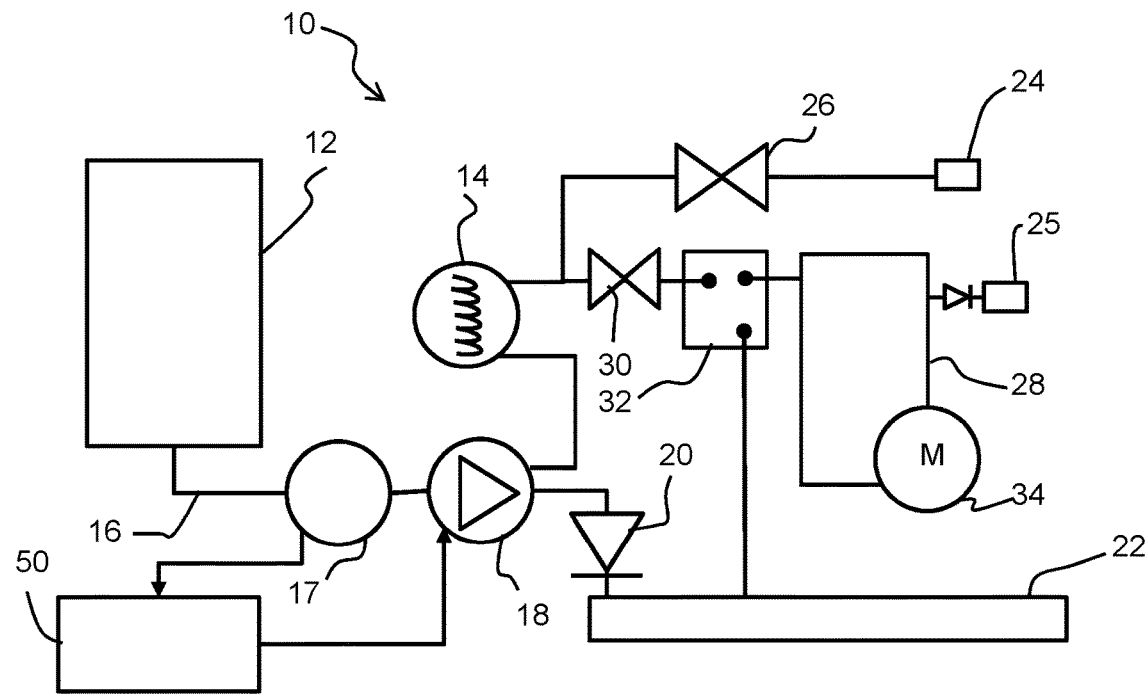
FIG. 1 shows the components of a known espresso coffee machine to which the flow delivery system of the invention may be applied.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a flow delivery system for delivering and monitoring a liquid flow, using a pump, and a monitoring device (which may be part of a flow meter). A controller determines if the flow is a liquid flow or a gas flow by reducing a drive signal for the pump from a first drive signal to a second drive signal. This changes the characteristics of both the pump drive signal and the characteristics of the resulting flow. Based on the change in said characteristics, the flow is determined to be a liquid flow or a gas flow.

The invention relates generally to any flow delivery system which combines a pump and a monitoring device, and where it is intended to determine if there is a liquid flow (e.g. water) or a gas flow (e.g. air), typically because the source of liquid has run out.

The invention may for example be used in a beverage machine, such as a coffee machine.

To give an example of a possible application of the invention, FIG. 1 shows the components of a known espresso coffee machine, and in particular shows the fluid paths in the system.

The coffee machine 10 comprises a water container 12, a water heater 14 for heating water to generate steam and hot water and having a water heater outlet, and a water pump 18 for pumping the heated water and steam. There is additionally a water dosing flow meter 17.

The flow meter 17 has a monitoring device with a rotary member e.g. impeller which is rotated by a flow through the monitoring device generated by the pump. A sensing arrangement is provided for sensing rotation of the rotary member, thereby to detect the flow. This sensing arrangement for example comprises a magnetic sensing circuit, which detects when a magnet (or set of magnets) carried by the impeller passes a magnetic sensing circuit.

The pump delivers water to the heater 14. In addition, there is an over-pressure valve 20 from the heater to a water collection unit 22 for collection or discharge of waste water in the form of a drip tray.

The heater 14 may selectively supply hot water of about 100° C. for brewing coffee, and steam of about 140° C. (or more) for heating and/or frothing milk. The steam may be provided to a steam delivery nozzle 24 through a first valve 26. The hot water may be provided to a brew chamber 28 through a second valve 30 and a control unit 32. The control unit 32 allows water to be discharged to the water collection unit 22 for example during cooling down of the heater after a steam cycle. Brewed coffee may be dispensed from the brew chamber 28 via a coffee delivery nozzle 25, which may include a crema valve as illustrated.

The coffee machine may further have a reservoir for receiving coffee beans and a grinder, so that a full bean-to-cup function is provided. Alternatively, the ground coffee may be supplied in a capsule, pod or the like pre-portioned provision. These elements are not shown as they do not relate to the hydraulic components.

The operation of the machine is entirely conventional, and the general operation of the coffee machine will not be described in further detail.

Furthermore, the invention may be applied to any coffee machine, as long as there is a pump and a flow meter. The coffee machine may be for creating drip filtered coffee or for delivering water to a coffee pod, instead of an espresso machine. The invention may be applied to other beverage machines or other food processing appliances which deliver liquid (e.g. water) from a water container to a food preparation area. Thus, the invention may be applied to a coffee machine having only a sub-set of the components shown in FIG. 1. Indeed, a full function coffee machine will typically include a level sensor for the water container. The invention relates to a cost reduction measure which avoids the need for water level sensing, and thereby is of particular interest for low-cost and low complexity beverage machines or food processing appliances.

The invention relates in particular to the use of monitoring to detect when the water container 12 is empty, for example to avoid the need for a water level sensor. The aim is for example to prevent pump deterioration caused by long activations in dry conditions, and for this purpose it is desired to detect air flow within the shortest possible time, once the pump has been energized: This should for example happen in less than 20 seconds and preferably in less than 15 seconds.

Figure 2:
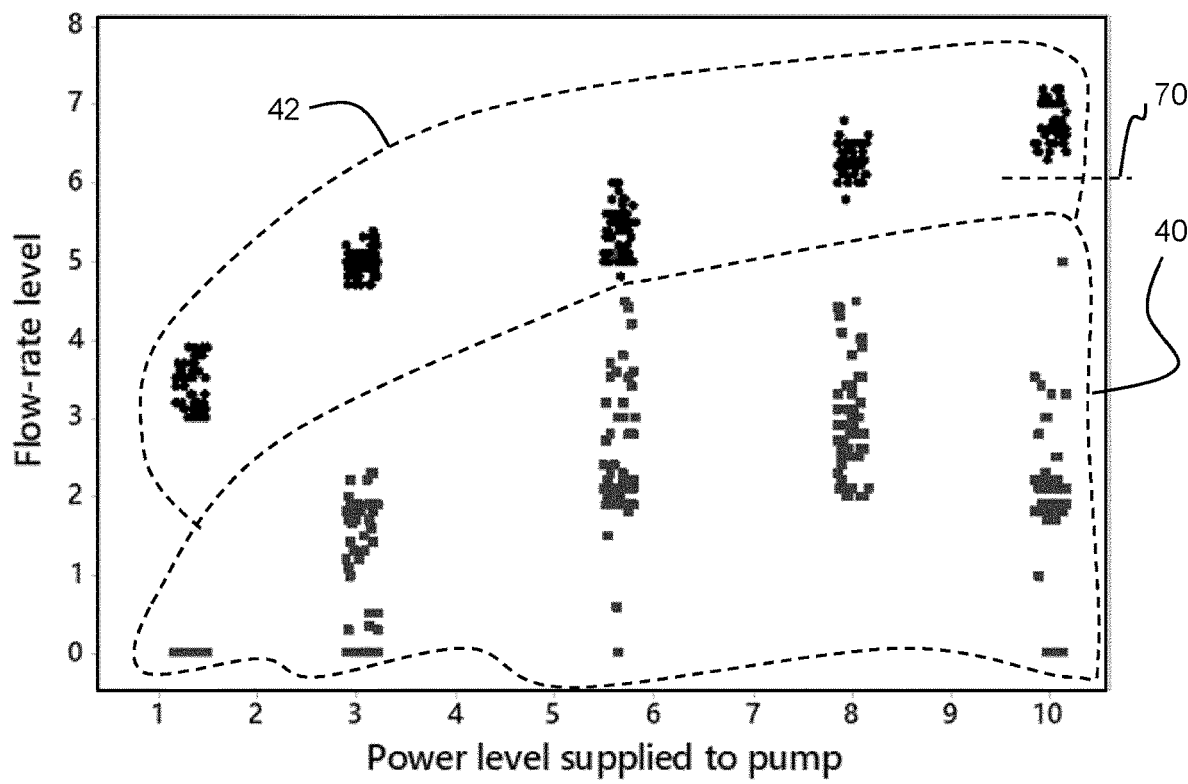
FIG. 2 shows a plot of the flow rate measured by a flow meter in response to an air flow and in response to a water flow.

FIG. 2 shows a plot of a flow rate measured by the flow meter 17 in response to a gas flow, in particular an air flow (the plots in region 40) and in response to a liquid flow, in particular a water flow (the plots in region 42) for different pump drive signals or levels (e.g. pump powers).

The pump power level 10 is the maximum pump drive signal, for delivering a maximum water flow. The flow rates of water and air are clustered into separate areas but there are outliers which means the separation is not sharp.

It can be seen that at lower pump drive signals, e.g. power level 3, the separation is much more binary. Thus, a flow level threshold may be set at this reduced power level which more reliably distinguishes between air flow and water flow.

The invention provides a controller 50 (see FIG. 1) for determining if the flow is a liquid flow or a gas flow. Initially, the controller controls the pump with a first drive signal, e.g. pump power level 10 in FIG. 2.

In response to a detected flow which may be a gas flow, the drive signal for the pump may be reduced according to different approaches, from the first drive signal to a second drive signal, thereby to change the characteristics of the pump drive signal and the characteristics of the resulting flow. Based on the change in one or both of these characteristics, the flow is determined to be a liquid flow or a gas flow.

Figure 3:
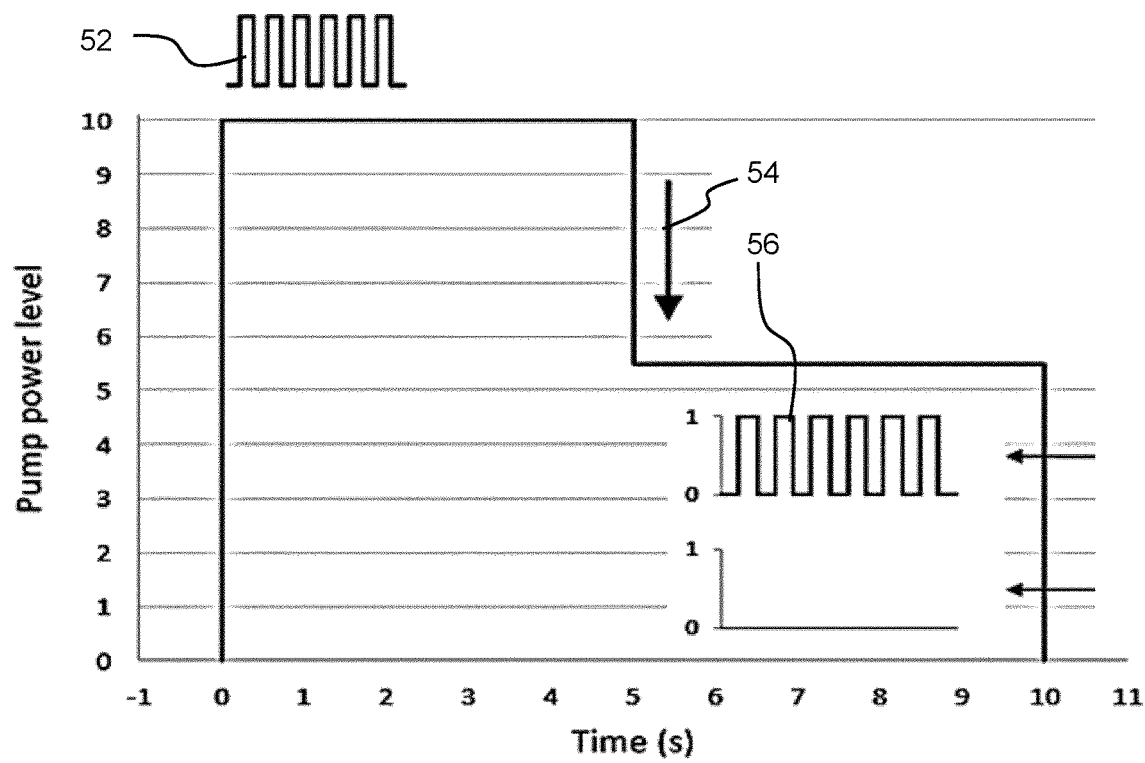
FIG. 3 is used to explain a first approach in accordance with the invention.

FIG. 3 is used to explain a first approach.

From time 0 to 5, the maximum pump power level (level 10) is applied. The flow meter delivers a sensing output in the form of a pulse train 52. At time 5, it is desired to determine if the pulse train, which is indicative of a general flow, is the result of a liquid flow or a gas flow.

This determination may be made periodically, at a rate sufficient that if the water supply has run out, the pump will not have been left running for more than a certain time, such as 10 seconds or 15 seconds.

The determination may be made each time the pump is activated, i.e. at the beginning of the beverage generation cycle.

It would be possible to perform the determination periodically thereafter, e.g. every 15 seconds, to monitor in real time when the water supply runs out, to ensure that the pump does not run dry for longer than a predetermined time. This control approach is however somewhat inconvenient for the user once the beverage is under delivery. In particular, performing a periodic check, additionally to a check at the pump activation, may increase the total beverage preparation time and may result in an undesirable pump noise change as consequence of the change in pump drive signal.

In any case, the monitoring device may not be as sensitive to an air flow when the water has just run out, because the monitoring device will still be wet and is therefore likely to stop to enable detection of a no flow condition. Thus, additional periodic checks are typically not needed during the course of a drink preparation if the water had not yet run out at the start of the drink preparation.

As shown by arrow 54, the drive signal for the pump is reduced from the first drive signal (level 10) to a predetermined second drive signal (level 5.5 in this example). This results in sensing pulse train 56. A flow parameter of this pulse train is measured to determine if the flow is a liquid flow or a gas flow.

In this example, a predetermined lower pump drive signal is used for testing. The flow levels expected for gas flow and for liquid flow are better resolved at that lower pump drive signal than at the first (e.g. maximum flow) pump drive signal (as explained in reference to FIG. 2).

This approach thus involves pump control to a predetermined power supply level in order to emphasize the different air versus water flow effects on the pump and flow meter behavior.

The flow parameter is for example a frequency of the flow meter signal. If the flow meter signal frequency is greater than a threshold then water is flowing, else air is flowing.

Figure 4:
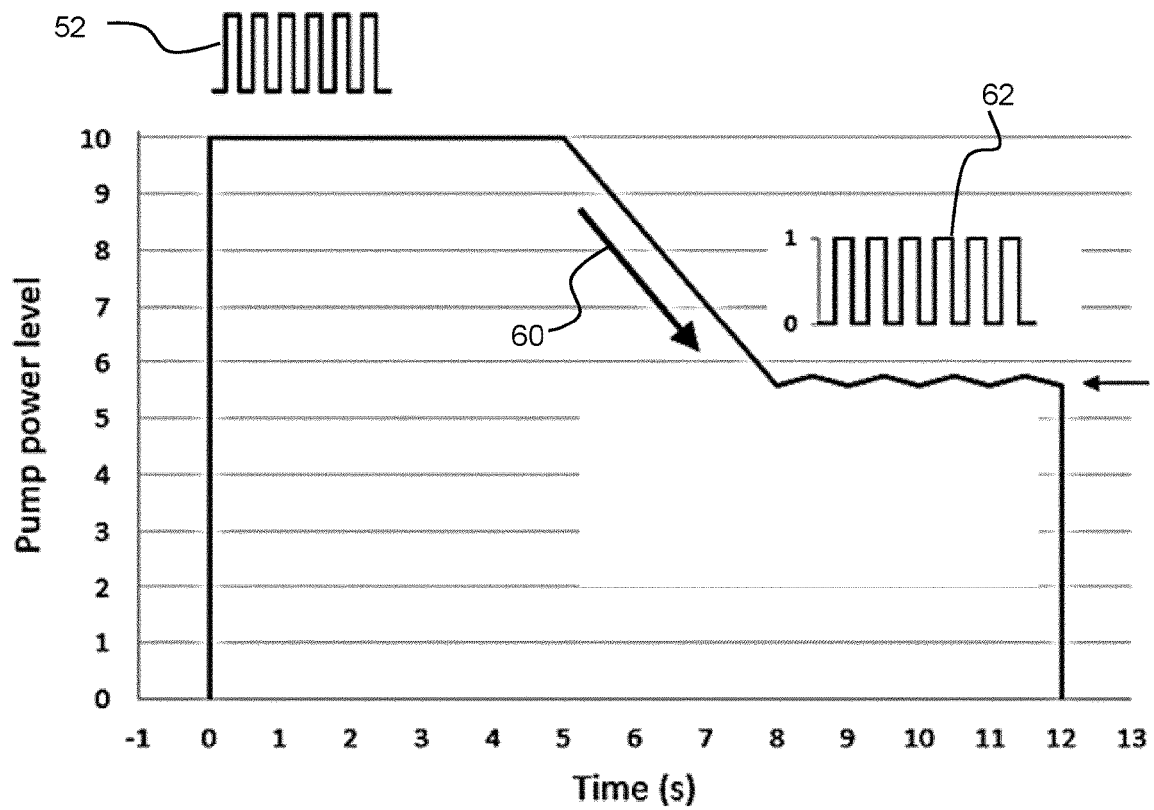
FIG. 4 is used to explain a second approach in accordance with the invention.

FIG. 4 is used to explain a second approach.

From time 0 to 5, the maximum pump power level (level 10) is again applied. The flow meter delivers a sensing output in the form of a pulse train 52. At time 5, it is desired to determine if the pulse train is the result of a liquid flow or a gas flow.

As shown by arrow 60, the drive signal for the pump is progressively reduced from the first drive signal (level 10). This example shows a linear ramp, but other shapes may be used. There is no fixed end point in this example.

The pulse train progressively changes and the flow is monitored. A second drive signal is identified as that at which the flow parameter drops to a predetermined level. Based on the second drive signal at that time, it is determined if the flow is a liquid flow or a gas flow.

In this approach, the pump drive signal is reduced until a predetermined lower flow parameter (e.g. flow rate) is reached for which the sensed pulse train is shown as 62. The pump drive signal needed for this lower flow rate is then indicative of whether the flow is a gas or liquid.

This approach thus involves pump control to achieve a predetermined flow parameter (e.g. flow rate), in order to emphasize different air versus water effects on the pump and flow meter behavior.

If there is a detected flow, then a reduced power is supplied to the pump until a predetermined flow parameter threshold is reached. If this happens with a power supplied to the pump below a power threshold then water is flowing, else air is flowing.

Figure 5:
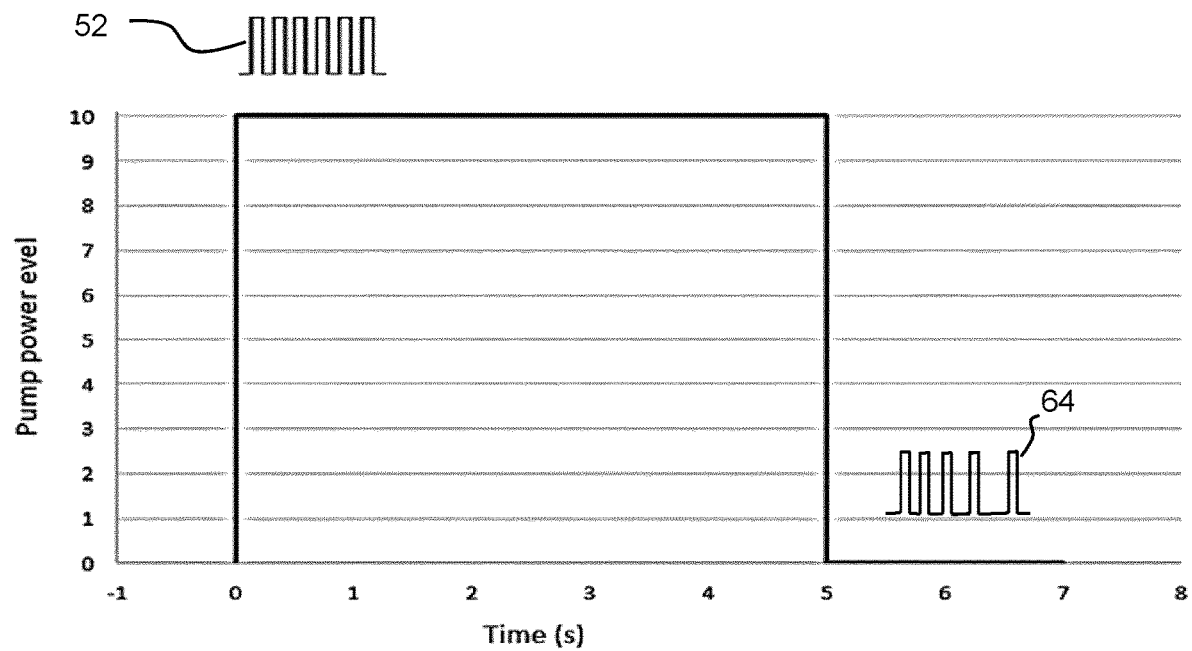
FIG. 5 is used to explain a third approach in accordance with the invention.

FIG. 5 is used to explain a third approach.

From time 0 to 5, the maximum pump power level (level 10) is applied. The flow meter delivers a sensing output in the form of a pulse train 52. At time 5, it is desired to determine if the pulse train is the result of a liquid flow or a gas flow.

The drive signal for the pump is reduced from the first drive signal (level 10) to zero.

This results in sensing pulse train 64. The temporal response of the measured flow parameter is used to determine if the flow is a liquid flow or a gas flow. This is typically a decay function, and it is manifested as increasing time periods between successive pulses of the pulse train 64, as schematically represented in FIG. 5.

This temporal response relates to the way the rotary member slows when a flow has been interrupted. Gas and liquid provide different resistance to the slowing of the rotary member.

As explained above, the controller 50 only needs to perform the determination if there is a detected flow.

In one example any detected flow is sufficient for the determination to be made. During the maximum pump signal, the flow parameter may be compared with a threshold 70 to determine that the flow must be a liquid flow. As shown in FIG. 2, this threshold 70 may be above any possible air flow. Thus any flow parameter value above the threshold 70 must be a water flow. However, any flow parameter value below the threshold 70 may be an air flow but could also be a water flow. So if the flow parameter value is below the threshold 70, the determination may not be sufficiently reliable to conclude that there is no chance that it is a water flow (because of the non-binary scattering of possible flow parameter values), so one of the three possible approaches outlined above is then followed.

Figure 6:
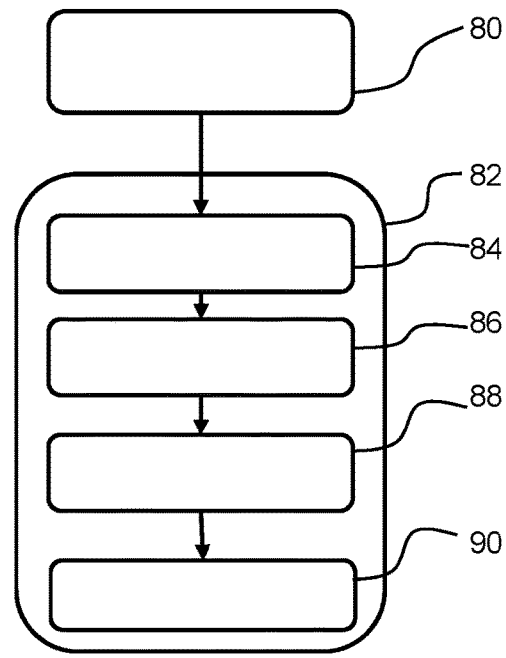
FIG. 6 shows a method for delivering a liquid flow using a pump and monitoring the liquid flow.

FIG. 6 shows a method for delivering a liquid flow using a pump and monitoring the liquid flow, comprising:

In step 80, sensing rotation of a rotary member thereby to detect a flow; and In step 82 determining if the flow is a liquid flow or a gas flow.

Step 82 comprises the sub-steps of:

controlling the pump with a first drive signal in sub-step 84;

detecting a flow which may be a gas flow in sub-step 86, and in response:

in sub-step 88 reducing the drive signal for the pump from a first drive signal to a second drive signal, thereby to change the characteristics of the pump drive signal and the characteristics of the resulting flow; and in sub-step 90 determining if the flow is a liquid flow or a gas flow based on the change in said characteristics.

The three possible approaches explained above may be implemented as part of sub-step 90.

As mentioned above, the invention is applicable to many different beverage making appliances or even food preparation appliances. The invention is of interest for low cost machines, for example without any water level sensor. However, the approach of the invention is also of interest for specific machine situations, such as the start-up and/or water loading routines, even for more complex machines. In these cases there are high chances that the flow meter will be dry.

By way of example, some coffee machines, such as full automatic coffee machines, have a water loading routine which is part of a start-up routine for the first pump activation, following the connection of the machine to the power supply system or after a certain period from the last machine usage.

Alternatively or additionally, such a water loading routine may be initiated based on problems detected with the water supply system, for example when a water level sensor indicates the presence of water at the water container but the signal provided by the flow meter doesn't match the expected working range, for example if no flow is detected.

The detection of gas (air) versus liquid (water) flow in the manner explained above may be used as part of these routines.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. (optional)

If the term "adapted to" is used in the claims or description, it is noted the term "adapted to" is intended to be equivalent to the term "configured to".

Any reference signs in the claims should not be construed as limiting the scope.

The invention claimed is:

1. A flow delivery system for delivering and monitoring a liquid flow, the system comprising:
   a pump;
   a monitoring device for monitoring a flow generated by the pump;
   a sensing arrangement for detecting the presence of a flow monitored by the monitoring device; and
   a controller for determining if the detected flow is a liquid flow or a gas flow, wherein the controller is adapted to:
      control the pump with a first drive signal;
      in response to a detected flow which may be the gas flow, reduce a drive signal for the pump from the first drive signal to a second drive signal, thereby to change characteristics of the pump drive signal and characteristics of the resulting flow; and
      based on the change in said characteristics, determine if the flow is the liquid flow or the gas flow.

2. The system as claimed in claim 1, wherein the first drive signal is a pump drive signal intended for delivering the liquid flow at a predetermined rate, and wherein the first drive signal is a maximum pump drive signal.

3. The system as claimed in claim 1, wherein the controller is adapted to determine if the detected flow is the gas flow by:
   detecting any flow; or
   determining if a flow parameter for the detected flow is below a first threshold.

4. The system as claimed in claim 1, wherein the controller is adapted to:
   in response to the detected flow which may be the gas flow, reduce the drive signal for the pump from the first drive signal to a predetermined second drive signal; and
   based on a measured flow parameter when the pump is driven with the predetermined second drive signal, determine if the flow is the liquid flow or the gas flow.

5. The system as claimed in claim 1, wherein the controller is adapted to:
   in response to the detected flow which may be the gas flow, reduce the drive signal for the pump in a controlled manner from the first drive signal;
   monitor a flow parameter during the progressively reducing drive signal;
   determine the second drive signal as that at which the flow parameter drops to a predetermined level; and
   based on the second drive signal, determine if the flow is the liquid flow or the gas flow.

6. The system as claimed in claim 1, wherein the controller is adapted to:
   in response to the detected flow which may be the gas flow, reduce the drive signal for the pump from the first drive signal to a zero drive signal; and
   based on the temporal response of a measured flow parameter, determine if the flow is the liquid flow or the gas flow.

7. The system as claimed in claim 3, wherein the monitoring device comprises a rotary member which is rotated by a flow through the monitoring device generated by the pump, and the sensing arrangement is for sensing rotation of the rotary member, thereby to detect the flow.

8. The system as claimed in claim 7, wherein the flow parameter comprises an indication of a rotation speed of the rotary member.

9. The system as claimed in claim 8, wherein the flow parameter comprises a characteristic of a pulse train signal generated by the monitoring device.

10. A beverage machine comprising:
a water container;
a beverage making section; and
the flow delivery system as claimed in claim 1 for delivering water from the water container to the beverage making section and for monitoring the water flow to the beverage making section,
wherein the controller is for determining when the water container is empty and for stopping the pump when the water container is empty.

11. A method for delivering a liquid flow using a pump and monitoring the liquid flow, comprising:
sensing using a flow monitoring device thereby to detect a flow; and
determining if the flow is a liquid flow or a gas flow by:
controlling the pump with a first drive signal;
detecting a flow which may be the gas flow, and in response:
reducing a drive signal for the pump from the first drive signal to a second drive signal, thereby to change characteristics of the pump drive signal and characteristics of the resulting flow; and
determining if the flow is the liquid flow or the gas flow based on the change in said characteristics.

12. The method as claimed in claim 11, comprising, in response to detecting the flow which may be the gas flow:
reducing the drive signal for the pump from the first drive signal to a predetermined second drive signal; and
determining if the flow is the liquid flow or the gas flow based on a measured flow parameter when the pump is driven with the second drive signal.

13. The method as claimed in claim 11, comprising, in response to detecting the flow which may be the gas flow:
reducing the drive signal for the pump in a controlled manner from the first drive signal;
monitoring a flow parameter during the reducing drive signal;
determining the second drive signal as that at which the flow drops to a predetermined level; and
based on the second drive signal, determining if the flow is the liquid flow or the gas flow.

14. The method as claimed in claim 11, comprising, in response to detecting the flow which may be the gas flow:
reducing the drive signal for the pump from the first drive signal to a zero drive signal; and
determining if the flow is the liquid flow or the gas flow based on the temporal response of a measured flow parameter.

15. A computer storage media comprising computer program code means which is adapted, when said computer program code is run on a computer, to cause a flow delivery system implement the method of claim 11.

* * * * *